United States Patent [19]

Crook

[11] Patent Number: 4,845,814

[45] Date of Patent: Jul. 11, 1989

[54] WEDGE SOCKET

[75] Inventor: Edward J. Crook, Tulsa, Okla.

[73] Assignee: Crosby Group, Inc., Tulsa, Okla.

[21] Appl. No.: 273,736

[22] Filed: Nov. 15, 1988

Related U.S. Application Data

[63] Continuation of Ser. No. 37,824, Apr. 13, 1987, abandoned.

[51] Int. Cl.$^4$ ............................................. F16G 11/04
[52] U.S. Cl. ............................. 24/136 R; 24/135 R; 403/369
[58] Field of Search ............... 294/102.1; 403/369, 403/374, 409.1; 24/115 R, 115 M, 122.6, 135 R, 135 K, 136 R

[56] References Cited

U.S. PATENT DOCUMENTS

| | | | |
|---|---|---|---|
| 1,390,830 | 9/1921 | Snow | 403/369 |
| 1,647,398 | 11/1927 | Draheim et al. | 24/115 M |
| 3,158,915 | 12/1964 | Olesen | 403/369 |
| 3,163,902 | 1/1965 | Bernburg et al. | 403/369 |
| 3,351,986 | 11/1967 | Johnson | 403/369 |
| 3,816,012 | 6/1974 | Hubbell | 403/369 |

FOREIGN PATENT DOCUMENTS 2750496 5/1979 Fed. Rep. of Germany ...... 403/374

OTHER PUBLICATIONS

Wire Rope Rigging Manual, (No Date), pp. 45, 46.
Crosby Group Catalog, (No Date), pp. 34, 39.
Sauerman Brothers Inc., "Bulletin TGS-2", (No Date).

Primary Examiner—James R. Brittain
Attorney, Agent, or Firm—Head & Johnson

[57] ABSTRACT

Wedge sockets are among the simplest devices for anchoring a wire rope for any purposes. They are intended for "on the job" attachment and for quick rope replacement. Principal advantages are simplicity, ease and speed of applying and detaching. Wedge sockets are commercially available and an information article on wedge sockets appears in attachment "A", "Wire Rope Rigging Manual", pages 45 and 46. The most commonly used wedge socket is believed represented by that information appearing on pages 34 and 39 of The Crosby Group catalog, a copy attached hereto as Exhibit "B". Also of interest is the Bulletin TGS-2 of Sauerman Brothers Inc., which is attached hereto as Exhibit "C". The following U.S. Pat. Nos. are noted: 3,905,711; 3,351,986; and 4,602,891.

3 Claims, 5 Drawing Sheets

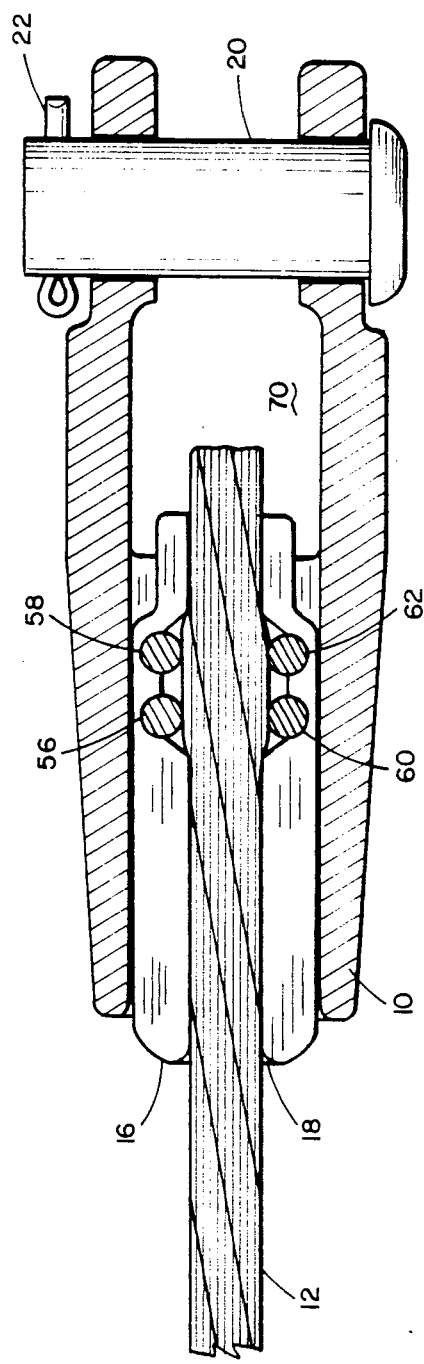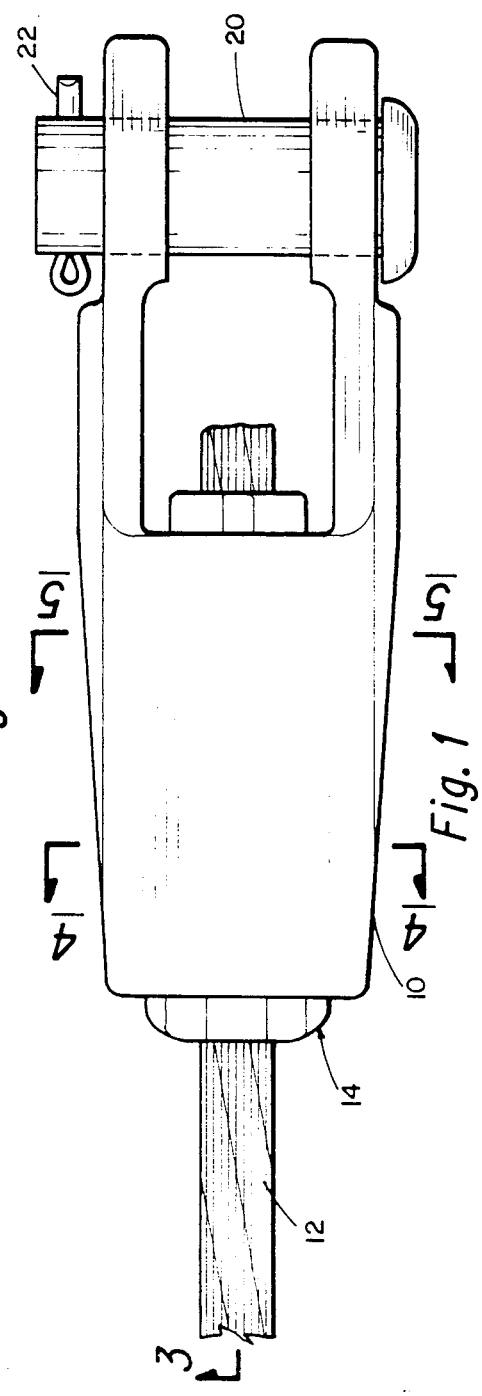

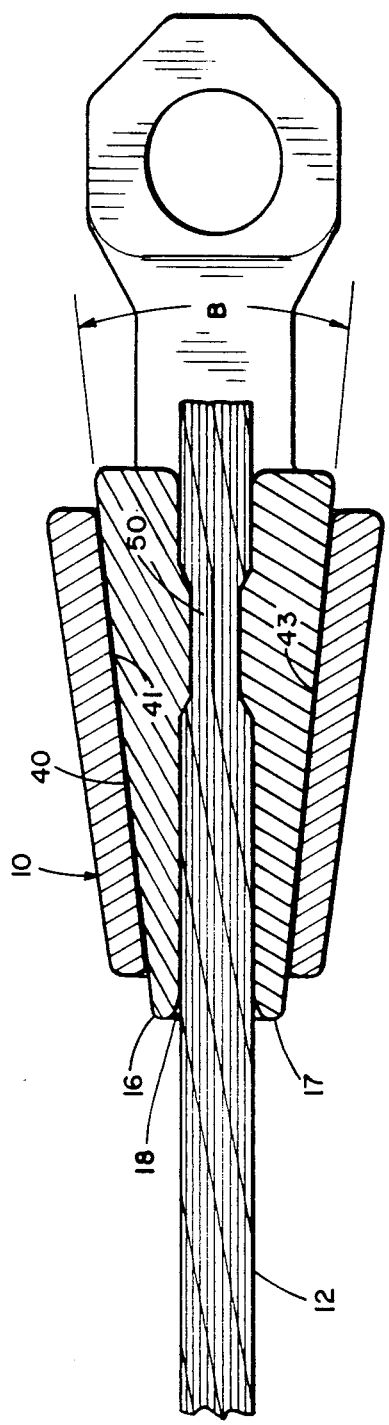
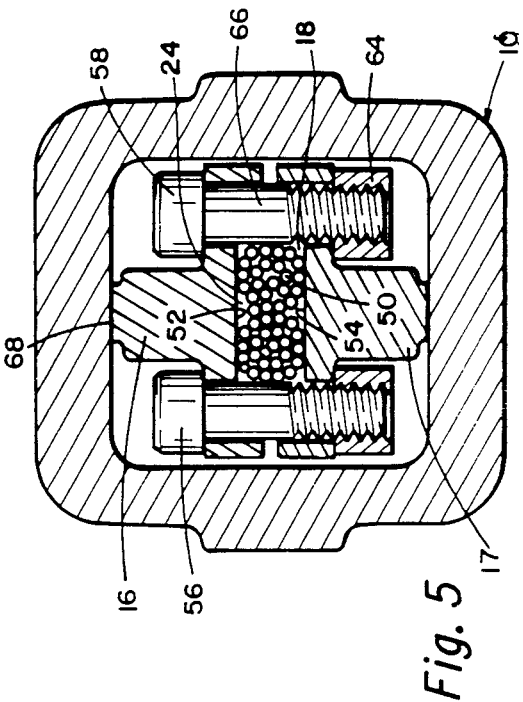
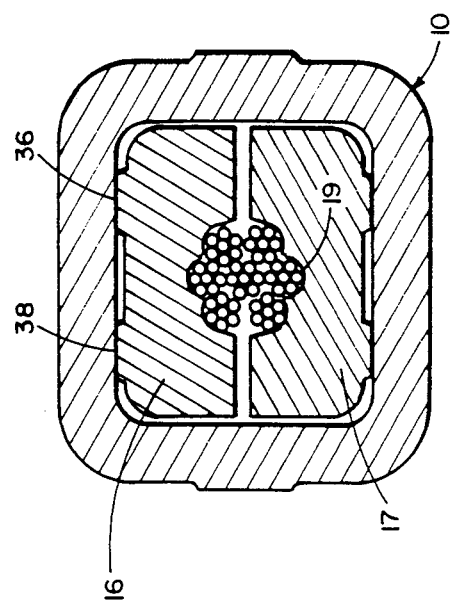
Fig. 3
Fig. 4
Fig. 5

WEDGE SOCKET

This is a continuation of co-pending application Ser. No. 037,824 filed on Apr. 13, 1987, abandoned.

BACKGROUND OF THE INVENTION

This invention relates to clamping or gripping devices for wire rope and particularly to an improved wedge socket for clamping the end of a cable.

Wedge sockets are among the simplest devices for anchoring a wire rope or cable for any of numerous purposes. They are intended for "on the job" attachment and for quick rope replacement. Principal advantages are simplicity, ease and speed of applying and detaching. They are also used where conditions are such that spliced eyes cannot be reeved and would have to be made after the rope is in place. Wire lines, commonly called cable, are used with lifting machines such as cranes. The wire hangs over a pulley from the crane and has a free end dangling down below. Wedge sockets are typically connected to this lower end of the wire rope and a hook or other member is attached to the socket. Thus, the socket provides means for coupling the free end of the wire rope to buckets or other apparatus which are then lifted or transported by a crane.

Typical open wedge sockets include a wedge member and a socket for receiving the wedge member. A cable is captured in the socket by passing the free end of the cable through the socket, laying the wedge on the cable, and returning the free end of the cable over the wedge and back through the socket. As the size of the wire rope increases, the difficulty of this manual manipulation increases. To achieve the turnback, much more wire rope is used than is necessary for the final assembly. After assembly, the excess is trimmed off and discarded.

Some device is usually attached to the dead end segment of the wire rope to facilitate the moving of the wedge into the socket when the initial load is applied. Also this device prevents slippage if slack is induced into the system by something striking the stub end of the wire rope or the small end of the wedge. Another problem is that the wire rope can be installed in reverse position which will cause a relatively sharp kink in the wire rope when the wire rope is applied.

There has been similar effort to overcome some of the concerns listed above by using a wedge as socket inside a concave shaped basket. Typical of this type socket is that represented by U.S. Pat. No. 3,351,986. This type socket overcomes some of the concerns with the more commonly used wedge socket. However, those designs have some shortcomings, such as: 1. They require a high degree of initial clamping effort to insure that the wire rope will not slip through the rope channel during initial load application. Most of the present clamps of this general configuration contains a U-bolt. This clamping effort comes from such U-bolt which after initial load application must be retightened. This concentrated clamping force on the live end of the wire rope has a reducing effect on the potential fatigue life of the termination. Also, it has a reducing effect on the termination efficiency. The U-bolt clamps wedge elements outside of the basket and is unsightly and can snag objects with which it might come in contact. Further the wedge surface that contacts interior surface of the socket is convex allowing for concentrated load transmission to the socket.

It is thus seen that there is a need for a wedge socket which overcomes the shortcomings.

As additional background, it should be stated that the efficiency of a termination (end of wire rope secured in socket) is a rating derived as a ratio of the rated catalog working strength of the wire rope to the breaking strength of the wire rope when used in a termination. As an explanation of the significance of this rating the following example is offered in which a certain size and class of wire rope has a rated catalog ultimate strength of fifty thousand pounds. If this wire rope were used with the wedge socket having an efficiency of termination of eighty percent then the expected resulting ultimate strength of the wire rope would be forty thousand pounds. The reduction in the relative strength of the wire rope is caused by the severe compression of the wire rope in the region where the wire rope/wedge/basket interface.

A system designer must use the termination rating to derive the proper rated capacity of the wire rope. For example, under OSHA regulations, the running lines on a mobile crane must have a safety factor of at least 3.5. Using a crane that has an adequate line pull and stability and using a fifty thousand pound wire rope with an eighty percent wedge socket for a single part line, the maximum allowable load to be lifted would be 50,000×0.8 divided by 3.5=11,428 pounds. If however,the wedge socket has a ninty five percent efficiency rating, the maximum allowable load would be 50,000×0.95 divided by 3.5=13,571 pounds. The importance of a high termination rating is thus quite apparent.

SUMMARY OF THE INVENTION

This is an improved wedge socket for wire rope. The system includes a wire rope and a wedge which has a hollow housing or basket which has two opposite planar surfaces which converge or taper toward the smaller end of the opening. A wedge is made up of two elements and has a wire rope passage therethrough. Each wedge element has a planar tapering surface which mates with one of the interior planar surface of the basket. The passage has a restriction or throat near the larger end of the wedge so that when the two elements of the wedges are forced onto the wire rope together there is a reoriented zone of wire rope. Means such as bolts, is provided to pull the wedges together at this restricted area so that the wire cable is reoriented and at least partially flattened in the restricted section. When finally assembled, the bolts are completely within the basket or housing so that they cannot snag on anything. As load is applied to the wire rope, the wedge elements are pulled tighter and tighter into the basket and as they are pulled tighter and tighter the wire rope passage grips the wire rope more and more firmly. The inside of the wire rope passage through the wedge outside the restricted area is provided with a configuration to match the lay of wire rope.

DESCRIPTION OF THE DRAWINGS

FIG. 1 is an elevational view of the wire line wedge socket of my invention.

FIG. 2 is a sectional, cutaway view of such socket of FIG. 1 but with attaching pin and wire rope shown full face.

FIG. 3 is a sectional view taken on the line 3—3 of FIG. 1.

FIG. 4 is a view taken along the line 4—4 of FIG. 1.

FIG. 5 is a cross sectional view taken along the line 5—5 of FIG. 1.

DETAILED DESCRIPTION OF THE INVENTION

Figure 6:
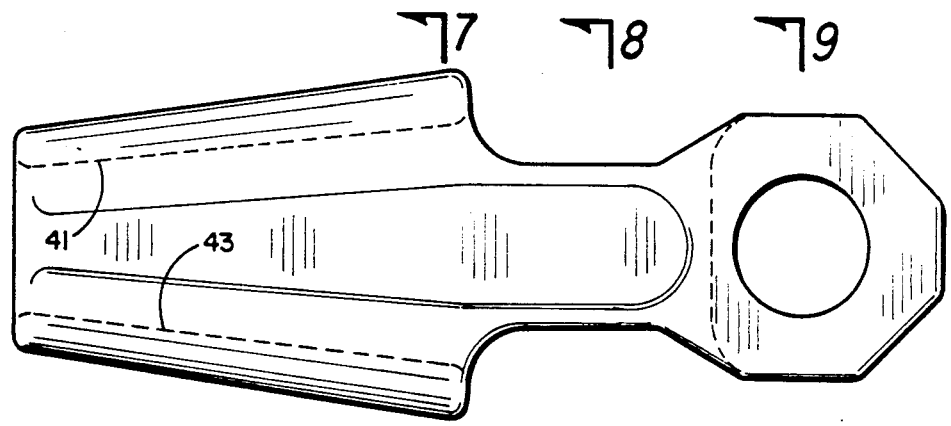
FIG. 6 is an elevational view of the basket.

Attention is first directed to FIG. 1 which shows an elevational view of the socket of my invention. Shown thereon is the housing or basket 10 with wire rope 12 held therein by wedge 14. An attaching pin 20 with cotter pin 22 is provided. Attention is next directed to FIG. 2 which shows the wire rope 12 held in passage 18 of first wedge element 16. There will be two such wedge elements 16 and each will have a wire line or rope passage 18 therethrough. One wedge 16 sits on top of a second wedge to form nearly circular rope passage fluted therethrough.

Figure 7:
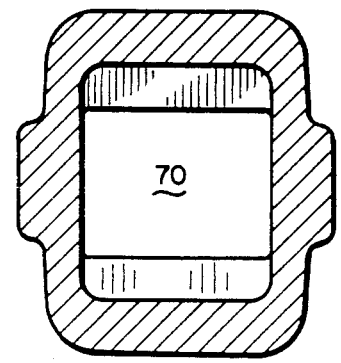
FIG. 7 is a view taken along the line 7—7 of FIG. 6.
Figure 8:
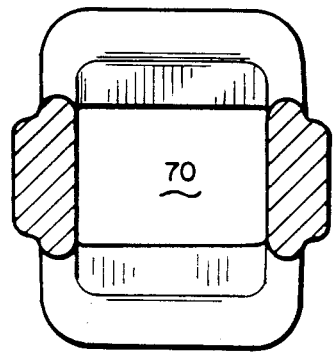
FIG. 8 is a view taken along the line 8—8 of FIG. 6.
Figure 9:
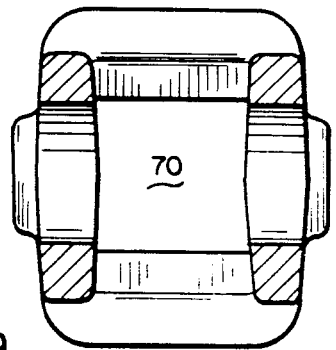
FIG. 9 is a view taken along the line 9—9 of FIG. 6.
Figure 10:
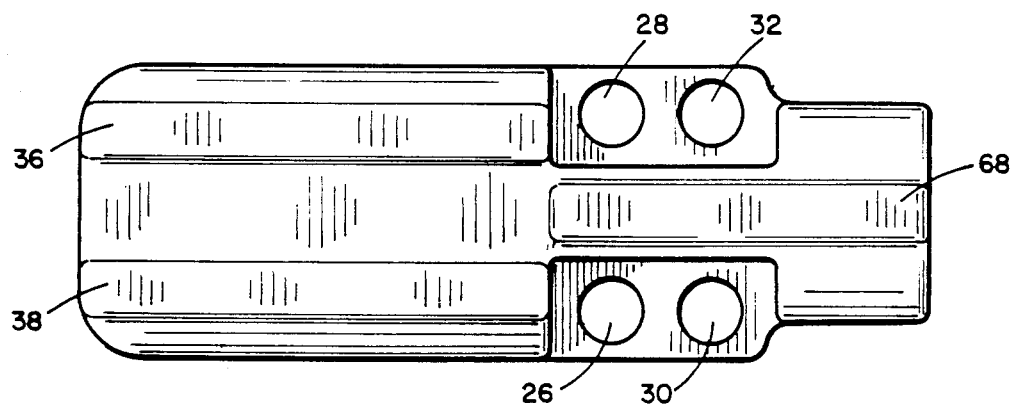
FIG. 10 is an elevational view of the wedge showing the bolt holes.
Figure 12:
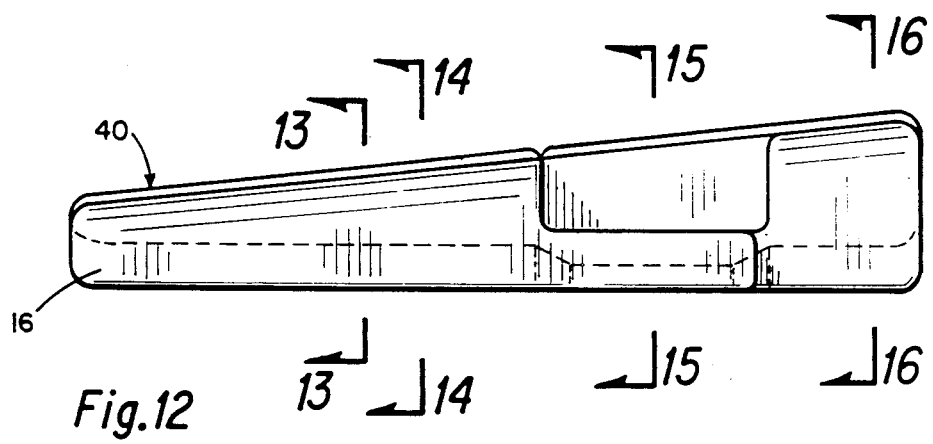
FIG. 12 is a side view of one wedge element which illustrates a wedge sloping surface.
Figure 11:
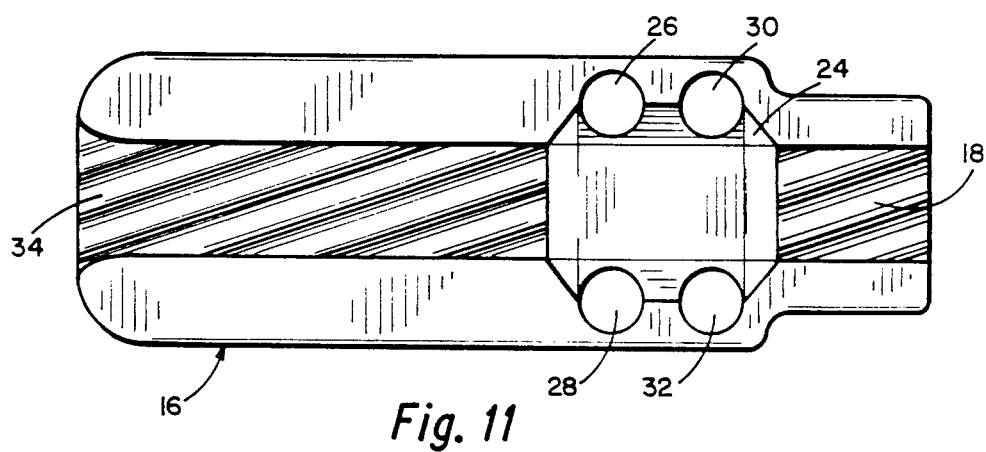
FIG. 11 is an elevational view of the side of wedge element showing the wire rope passage and that portion which mates with the like portion of the other wedge element.
Figure 13:
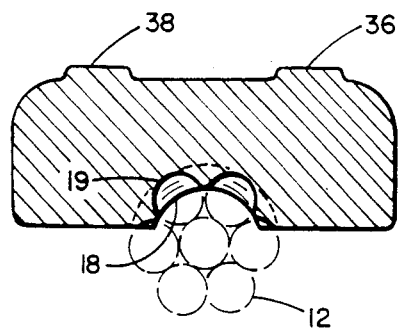
FIG. 13 is a view taken along the line 13—13 of FIG. 12.
Figure 14:
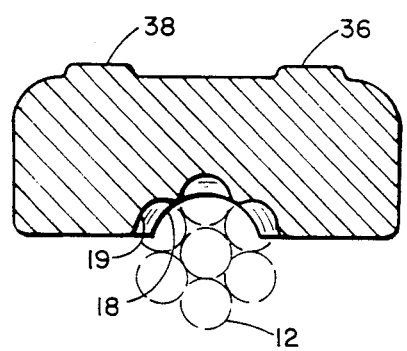
FIG. 14 is a view taken along the line 14—14 of FIG. 12.
Figure 15:
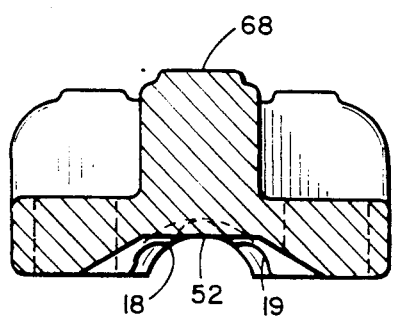
FIG. 15 is a view taken along the line 15—15 of FIG. 12.
Figure 16:
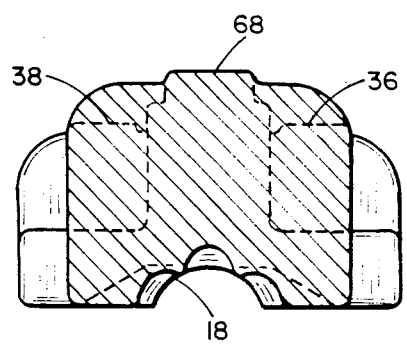
FIG. 16 is a view taken along the line 16—16 of FIG. 12.

The general shape of the wedge element can quickly be seen in FIGS. 10, 11 and 12. As shown in FIG. 12 one surface of the wedge element 16 is provided with a sloping or tapered surface 40. As can be seen in FIG. 3 this wedge surface 40 mates with the interior sloping surface 41 of basket 10. As also shown in FIG. 3 basket 10 has a second sloping surface 43 which is opposite sloping surface 41. There are two wedge elements inside the basket. They are wedge element 16 and wedge element 17. These elements are identical and will be described more fully in relation to FIGS. 10 through 16. An elevational view of the basket is shown in FIG. 6 and shows in dotted lines indicating sloping faces 41 and 43. FIGS. 7, 8 and 9 are taken on the lines 7—7, 8—8 and 9—9 of FIG. 6 and show the shape of the basket. The basket has a self-holding wedge angle B as shown in FIG. 3 between the two planar surfaces 41 and 43. Preferably this angle B is typically about 12° but the invention is not limited to that particular angle.

FIG. 11 shows the wedge element 16 on the non-wedge or flat side having passage 18 for receiving the wire line. There is a section 24 which is wider in this plane but is restricted in perpendicular plane. This section has bolt holes 26, 28, 30 and 32 extending therethrough. Trough 18 is provided with a Roddle configuration 34 having individual spirals 19 as shown in FIG. 4 and which match the right hand lay wire rope. The configuration will of course be designed to match the particular wire rope being used. FIG. 10 shows the "other" side of the wedge element from that shown in FIG. 11 and shows lands 36, 38 and 68 thereon. Attention is next directed to FIG. 12 which shows a side view of the wedge element of FIG. 11 and shows a wedge shaped planar side 40. As shown more clearly in FIGS. 13 and 14 the side 40 includes lands 36 and 38.

As clearly shown in FIGS. 3 and 5 the passage 18 is provided with a throat section 24 which can be called a wire rope reoriented zone 50 when the wire rope is secured therein. As can be seen in FIG. 5 throat section 24 has a planar surface 52. Wedge element 17 has a similar planar surface 54. As shown in FIGS. 2 and 5 there are four clamping bolts 56, 58, 60 and 62 which holds the wedge element 16 and wedege element 17 together. These bolts go through holes 26, 28, 30 and 32 as shown in FIGS. 10 and 11. These bolts are held by suitable multiple nuts 64. Alternatively, a single bar with two tapped holes in it may be used in lieu of multiple nuts. The clamping bolts 56, 58, 69 and 62 are not fully threaded. This is so that there will be provided a non-threaded or smooth surface 66 on each bolt which will contact the wire line 12. Wedge element 16 in the area adjacent the restricted area 50 has a single exterior land 68. The passage 18 has flutes 19 throughout the configuration 34.

Attention will now be directed to the assembly of this device so that wire rope 12 will be firmly anchored therein. To accomplish this the cable 12 is first inserted through the passage 70 of the basket with the wedge element 16 and 17 removed. The wire is inserted far enough through so that the wedge elements 16 and 17 can be placed about the end of the wire rope. While in this extended position, screws 56, 58, 60 and 62 are inserted and tightened to pull the two wedge elements 16 and 17 toward each other. Sufficient tightening is done to obtain a reoriented zone of wire rope as shown in FIG. 5. The wire rope in the region of the clamping screws then is forced into reorientation that increases the friction factor of the wire rope relative to the socket. By using this multiple bolts for clamping the wedge elements to the wire rope significantly reduces the effort required per bolt. FIG. 4 shows how the strands of the wire rope 12 nestle into flutes 19 which are shown in FIG. 11 are made to match the lay of the wire rope. The assembled wedge elements 16 and 17 and wire rope 12 can then enter into the passage of basket 10 between planar surfaces 41 and 43. The wedge socket has now been firmly attached to the wire rope and is ready for use. This can be accomplished merely by inserting the attaching pin 20 as shown in FIGS. 1 and 2 to support a hook or whatever else might be desired. Force on the wire line and resistance of weight supported by the pin 20 will force the wedge elements tighter together.

There are additional advantages to the improved wedge socket of this invention. These are now set forth:

When using this improved wedge socket only a straight section of wire rope is used in the assembly of it and it does not require that the wire rope be turned back at a relatively sharp bending radius. In my invention the concentrated securing force of the wedge segments to the wire rope is done at a location away from the critical stress region of the wire rope where the wire rope first interfaces with the wedge segments.

When the wedge socket is assembled to the wire rope, the clamping bolts 56, 58, 60 and 62 are in a protected position inside the basket. This gives improved appearance and also prevents the bolts from snagging on to objects.

The wire rope 12 in the region of the clamping screws, is forced into reorientation which increases the friction factor of the wire rope relative to the socket.

The friction factor resulting from the reorientation of the wire rope 12 is of such a magnitude that the clamping force required is 250% less than that used in conventional sockets.

The reorientation of the wire rope 12 in the clamping region causes the wire rope to bear against the clamping bolts offering additional resistance to the bolts backing out.

Using multiple bolts for clamping the wedge elements to the wire rope significantly reduces the effort required per bolt.

Tests show that the efficiency of the improved wedge socket of my invention is ninety five percent. This is higher than any known percentage of known conventional sockets.

The wire rope fatigue life is enhanced because the clamping force has not been concentrated in the critical stress section where the wire rope first interfaces with the wedge segments.

Using three lands, 38, 36 and 68 on the surface of the wedge segment that contacts the basket 10 provided for better distribution of the forces between the wire rope and the wedge segement and between the wedge segment and the basket.

The small end of the wedges and the end of the socket ear sections are blunted in shape so that by impacting one of the blunted surfaces while resting the other blunted surface upon an immovable object, the wedge segment can be removed from the basket.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An improved wedge socket assembly for gripping the end of a wire rope which comprises:

a basket having a longitudinal rectangular cross-sectioned sloped passage therethrough with a first end opening smaller than its second end opening, said passage defined by two opposed upper and lower planar sides forming internal tapered wedge surfaces and first and second opposed planar sides;

said basket having two ears extending outwardly from said second end with a coaxial opening that is transverse to said longitudinal passage;

a first wedge element and a second wedge element which when positioned in said longitudinal passage forms an essentially rectangular cross-sectioned sloped shape matching the shape of said rectangular cross-sectioned sloped passage with said first wedge element having an upper side contacting said upper planar side, said second wedge element having a lower side contacting said lower planar side, and each of said wedge elements having a pair of first and second opposed sides and each of said wedge elements forming from said first end opening to said second end opening a forward portion, a restricted portion and a rearward portion, said wedge elements having along said forward portion a pair of raised longitudinal parallel land surfaces on said upper side of said first wedge element and on said lower side of said second wedge element, said each of wedge elements along both said upper and lower sides of said restricted portion and said rearward portion having a single raised longitudinal land surface spaced between said pair of first and second opposed sides of said wedge elements all of said land surfaces operative against said upper and lower internal tapered wedge surfaces, each of said wedge elements having a longitudinal inner, generally semicircular, recess facing each other in cross section of a uniform size and shape along said forward portion and said rearward portion to receive said wire rope, said wedge elements in said restricted section each having a longitudinal inner planar surface facing each other and having less depth than each of their respective said recesses to form a longitudinal rectangular cross-sectioned opening for preloading or compressing said wire rope thereinto, and bolt holes and bolts received therein extending through said elements and straddling said restricted portion with said planar surfaces between said bolt holes.

2. An assembly as defined in claim 1 in which said restricted portion is closer to said second end opening of said basket than it is to said first end opening.

3. An assembly as defined in claim 1 wherein said recess at the end of said wedge elements adjacent said first end opening of said basket is curved outwardly.

* * * * *